United States Patent [19]

Ohtomo et al.

[11] 4,140,533

[45] Feb. 20, 1979

[54] ALKALI RESISTANT GLASS COMPOSITIONS AND ALKALI RESISTANT GLASS FIBERS PREPARED THEREFROM

[75] Inventors: Koichiro Ohtomo, Takatsuki; Takuji Yoshimura, Osaka; Hiroshi Fujii, Ohtsu, all of Japan

[73] Assignees: Kanebo Ltd., Tokyo; Nippon Electric Glass Company Ltd., Shiga, both of Japan

[21] Appl. No.: 856,991

[22] Filed: Dec. 2, 1977

[30] Foreign Application Priority Data

Dec. 8, 1976 [JP] Japan .................................. 51-146458

[51] Int. Cl.$^2$ ........................... C03C 13/00; C04B 7/02
[52] U.S. Cl. ........................................ 106/50; 106/52; 106/54; 106/99
[58] Field of Search ............... 106/50, 99, 52, 54

[56] References Cited

U.S. PATENT DOCUMENTS

| | | | |
|---|---|---|---|
| 3,783,092 | 1/1974 | Majumdar ............................... | 106/50 |
| 3,861,926 | 1/1975 | Irlam et al. ............................. | 106/50 |
| 3,861,927 | 1/1975 | Kimura et al. ......................... | 106/50 |
| 4,066,465 | 1/1978 | Mohri et al. ........................... | 106/50 |

FOREIGN PATENT DOCUMENTS 727779  11/1942  Fed. Rep. of Germany ............. 106/50

*Primary Examiner*—Helen McCarthy
*Attorney, Agent, or Firm*—Sherman & Shalloway

[57] ABSTRACT

An alkali resistant glass composition comprising the following oxides in a weight percentage composition of 57 – 64% $SiO_2$, 19 – 23.5% $ZrO_2$, 0.5 – 2.5% $Li_2O$, 11 – 18% $Na_2O$, 0 – 6% $K_2O$, 0 – 0.5% RO, 0 – 0.5% $Al_2O_3$ and 0 – 0.5% $M_xO_y$ wherein R is an alkaline earth metal, M is a metal other than an alkaline earth metal, and x and y are positive integers where (valence of M) multiplied by x = 2y, and satisfying the relationships defined by following expressions (1) and (2):

$$21 \geq Na_2O + Li_2O + K_2O \geq 15.5 \quad (1)$$

$$52 - 2ZrO_2 \geq 4Li_2O - K_2O \geq ZrO_2 - 21 \quad (2);$$

and alkali resistant glass fibers prepared therefrom.

18 Claims, No Drawings

ALKALI RESISTANT GLASS COMPOSITIONS AND ALKALI RESISTANT GLASS FIBERS PREPARED THEREFROM

This invention relates to alkali resistant glass compositions and alkali resistant glass fibers prepared therefrom. The invention also relates to a cement product reinforced with the alkali resistant glass fibers.

The glass fibers, in view of their superior tensile strength and extremely high Young's modulus as compared with the other organic and inorganic fibers, are being widely used as a suitable reinforcing material for such fiber-reinforced composite materials as FRP (fiber-reinforced plastics). Especially, with an increase in the construction of skyscrapers in recent years there is a strong demand for reducing the weight of the cement products while increasing their strength. Hence, researches into glass fiber-reinforced cements are being carried out extensively.

One of the most serious problems in using glass fibers for reinforcing cement is that the $Ca(OH)_2$ derived from CaO as a constituent component of cement, is dissolved to saturation in the cement matrix, with the consequence that the cement matrix exhibits a strong basicity of as high as pH 12 - 13.

Hence, the glass fibers are exposed to an alkaline atmosphere not only when used as a reinforcing material for cement products but also during the subsequent prolonged period of use of the product, with the consequence that when the ordinary so-called E glass fibers are used, the strength of the fibers themselves is reduced drastically, and thus the fibers cannot fully demonstrate their excellent characteristics as a reinforcing material. The possession of resistance to alkalis to a highest possible degree is thus a requisite condition for the glass fibers to be used for reinforcing cements.

For enhancing the alkali resistance of glass fibers, the use of a high zirconia ($ZrO_2$) content glass composition as the base has been suggested (see, for example, U.S. Pat. No. 3,862,926 and British Pat. No. 1,243,972).

However, while the resistance to alkalis of the resulting glass fibers could be enhanced by increasing the content of zirconia in the glass composition in accordance with these suggestions, there was the drawback that the spinnability would deteriorate rapidly. The principal reason for this was that despite the fact that the spinning temperature ($T_F$) [the temperature of the glass composition when the melt viscosity is 1000 poises] does not rise so much as an increase takes place in the content of zirconia, the liquidus temperature ($T_L$) [the temperature at which crystals are separated out when a glass composition in a molten state is slowly cooled] rises abruptly and, as a consequence, the temperature difference $T_F - T_L$ becomes excessively small as an increase takes place in the content of zirconia.

Again, the meltability of a glass composition becomes worse as its content of zirconia increases, and it becomes necessary to melt such a glass composition at higher temperatures. Consequently, the wear and tear of the melting furnace is great. Hence, it was not an easy matter to produce the glass fibers of high zirconia content on a commercial scale.

Some of the present inventors have found that it was possible to overcome the foregoing drawbacks of the high zirconia content compositions either by incorporating a given amount of $P_2O_5$ in said compositions (U.S. Pat. No. 3,973,974), by incorporating a given amount of $B_2O_3$ instead of the aforesaid $P_2O_5$ (Japanese Patent Application No. 85275/75), or by incorporating a given amount of $K_2O$ and an alkaline earth metal oxide (Japanese Patent Application No. 88793/75), for which applications for letters patent have already been made.

Subsequent researches by us have shown that the introduction of $P_2-5$ had the tendency of corroding the material making up the melting furnace. On the other hand, in the case of the introduction of $B_2O_3$ the alkali resistance that had been achieved by the high zirconia content tended to be reduced by the introduction of the $B_2O_3$. Moreover, there was the drawback that the face of the bushing tip would be soiled by the volatility of the $B_2O_3$. The introduction of an alkaline earth metal oxide such as CaO into glass compositions of high zirconia content would bring about a rise in the liquidus temperature ($T_L$), as hereinafter indicated, to result in the reduction of the temperature difference $T_F - T_L$ to that extent and cause a decline in the spinnability. Hence, it was found that the introduction of an alkaline earth metal oxide should be avoided insofar as possible.

Further, there has recently been proposed by Japanese Laid-Open Patent Publication No. 55309/76 an alkali resistant glass fiber composition having as its principal constituents by weight percent 53 - 63% $SiO_2$, 21 - 23% $ZrO_2$ and 10 - 21% $Na_2O$. This glass composition is notable for its extremely high zirconia ($ZrO_2$) content. However, when we repeated the experiments in accordance with this proposal, it was found that either the spinning temperature ($T_F$) of the high zirconia content glass composition actually disclosed in the foregoing laid-open patent publication was excessively high or its temperature difference $T_F - T_L$ was too small. Hence, this glass composition is unsuitable for spinning glass fibers on a commercial scale.

Our experience has shown that the spinning temperature ($T_F$) and the liquidus temperature ($T_L$) assume inherent values depending upon the composition of the glass used. Hence, for commercially spinning glass fibers of good quality without the breakage of fibers it is preferred that the following relationship should exist between the spinning temperature ($T_F$) and the liquidus temperature ($T_L$).

$T_F - T_L \geq 50°$ C (4a), and particularly $T_F - T_L \geq 60°$ C (4b).

On the other hand, it is essential that the relationship defined by the following expressions (5a, 5b) as regards the spinning temperature should hold good.

$T_F \leq 1310°$ C (5a), and preferably $T_F \leq 1300°$ C (5b).

It is an object of the present invention therefore to provide glass compositions of superior spinnability and alkali resistant glass fibers by satisfying the conditions that the glass composition is of a high zirconia content of 19 - 23.5% by weight and satisfying the relationships indicated by aforesaid expressions (4a), preferably (4b), and (5a), preferably (5b).

Another object of the invention is to provide glass compositions of good spinnability which moreover by including a large quantity of zirconia possess extremely good resistance to alkalies notwithstanding the fact the contents of such components as $P_2O_5$, $B_2O_3$ and the alkaline earth metal oxides, which were previously proposed by a part of the present inventors but subsequently found to be undesirable in view of their inherent actions, are less than 0.5% by weight, and preferably less than 0.3% by weight.

Other objects and advantages of the invention will become apparent from the following description.

It was found that the foregoing objects and advantages could be achieved in accordance with the present invention by a glass composition comprising the following oxides in a weight percentage composition of 57 – 64% $SiO_2$, 19 – 23.5% $ZrO_2$, 0.5 – 2.5% $Li_2O$, 11 – 18% $Na_2O$, 0 – 6% $K_2O$, 0.5% or less RO, 0.5% or less $Al_2O_3$ and 0.5% or less $M_xO_y$ where R is an alkaline earth metal, M is a metal other than an alkaline earth metal, x and y are positive integers where (valence of M) multiplied by $x = 2y$, and in which the numerical values corresponding to the weight percentages of the above oxides satisfy the relationships defined by the following expressions (1) and (2):

$$21 \geq Na_2O + Li_2O + K_2O \geq 15.5 \quad (1)$$

$$52 - 2ZrO_2 \leq 4Li_2O - K_2O \leq ZrO_2 - 21 \quad (2).$$

The invention will now be fully described hereinbelow.

It is known that an alkaline earth metal oxide such as CaO is used as a flux of glass. When such an oxide is used for the preparation of alkali resistant glass fibers of high zirconia content, the addition of, say, 0.6 – 7.5 mol% of CaO is necessary for obtaining a difference of more than 40° C. in the spinning and liquidus temperatures. Moreover, it is known that the presence of CaO is also of value in enhancing the alkali resistance of the glass fibers (see U.S. pat. No. 3,861,926, col. 5, lines 20 – 25 and col. 8, lines 26 – 32).

As a result of our further researches into the process of producing alkali resistant glass fibers of high zirconia content, it was found, however, to our surprise that as the amount added of the alkaline earth metal oxides such as CaO increased there was a gradual decline in the spinning temperature ($T_F$) of the high zirconia content glass composition, whereas at the same time its liquidus temperature ($T_L$) would behave contrariwise and rise in proportion to the amount added to the alkaline earth metal oxide, with the consequence that the temperature difference $T_F - T_L$ would be reduced proportionately. On the other hand, the spinning temperature ($T_F$) of a high zirconia content glass composition reaches as high as about 1400° C when the zirconia content is 19%. Now, if attempts were to be made to reduce the spinning temperature ($T_F$) of a high zirconia content glass composition having such a high spinning temperature by the addition of an alkaline earth metal oxide, it has been found that the temperature between the spinning temperature ($T_F$) and the liquidus temperature ($T_L$) decline abruptly in concomitance with the increases in the amounts added to the alkaline earth metal oxide, with the consequence that the spinnability of the resulting glass fibers is greatly impaired. (see the hereinafter-presented Table 2. )

Such being the case, we further our researches with a view to finding a component by the use of which it would be possible to reduce the high spinning temperature ($T_F$) of the glass compositions containing zirconia ($ZrO_2$) is such high amounts as 19 – 23.5% without using the alkaline earth metal oxides. As a result of these researches, it was found that of the alkali metal oxides lithium oxide ($Li_2O$) alone behaved uniquely, and that it was possible to very effectively reduce the spinning temperature ($T_F$) of the foregoing glass composition by incorporating lithium oxide in the composition in an amount of 0.5 – 2.5% by weight, and preferably 1 – 2% by weight. It was moreover found that there was only a very slight rise in the liquidus temperature ($T_L$) in this case, and further that the addition of the lithium oxide also enhanced the meltability of the glass composition (see the hereinafter-presented Table 3).

$Na_2O$ has been used in the past as an essential component of a glass composition, and it has been known that the spinning temperature ($T_F$) could be reduced by increasing the content of $Na_2O$ in a high zirconia content glass composition. According to our researches, it was found that in the case where only $Na_2O$ was incorporated as the alkali metal oxide in the glass composition there also existed a close relationship between the amount contained of $Na_2O$ and the liquidus temperature ($T_l$), the minimum point of $T_L$ being located within a restricted range of the $Na_2O$ content of about 15 – 16.5%, and that if the content of the $Na_2O$ became either smaller or greater than this, an abrupt rise would take place in the liquidus temperature ($T_L$) of said glass composition.

Further, while it has been known that $K_2O$ can be substituted for a part of the foregoing $Na_2O$, it has been found in accordance with the present invention that by substituting $K_2O$ in an amount of not more than 6%, preferably 0.5 – 3%, for the $Na_2O$ it is possible to reduce the liquidus temperature ($T_L$) of the glass composition further as compared with the instance where $Na_2O$ alone is used as the alkali metal oxide (see the hereinafter-given Table 4).

In consequence of having combined and examined the results of the foregoing researches, we found that the following factors, particularly the factors described in (A) and (B), below, were extremely important for obtaining glass compositions which by virtue of their high content of zirconia of as much as 18.5 – 23.5%, particularly 19 – 23.5%, gave glass fibers excelling in alkali resistance, which moreover could be spun with good spinnability. (A) An effective procedure for reducing the rise in the spinning temperature ($T_F$) of a glass composition whose temperature rise is ascribable to its high content of zirconia ($ZrO_2$) is to use a suitable amount of lithium oxide ($Li_2O$), it being important even within the foregoing range of zirconia contents that an increase in the contents of lithium oxide be made as the content of zirconia increases. Further, since the spinning temperature ($T_F$) also tends to rise with an increase in the content of $K_2O$, it is important that the amount added of lithium oxide be an amount sufficient to compensate for the rise in the spinning temperature ($T_F$) ascribable to the $K_2O$ [see the hereinafter-given expression (2)].

(B) Further, in order to increase the temperature difference $T_F - T_L$ of the glass composition to at least 50° C, especially at least 60° C, it is not only necessary to control the total content of the alkali metal oxides, i.e., $Na_2O + Li_2O + K_2O$ to fall within a suitable range but also necessary to ensure that each of the components $Na_2O$, $Li_2O$ and $K_2O$ be within a suitable range [see the hereinafter-given expression (1)].

(C) On the other hand, $Na_2O$ has the action of reducing the spinning temperature ($T_F$), as previously indicated hereinbefore. Hence, where the amount of $Na_2O$ added is great, the amount of lithium oxide can be reduced accordingly. Thus, it is an advantage to control the contents of Li$_2$O and Na$_2$O in accordance with the amount of zirconia contained [see the hereinafter-given expression (3)].

It was thus found in accordance with this invention that a glass composition comprising the following oxides in a weight percentage composition of 57 – 64% SiO$_2$, 19 – 23.5% ZrO$_2$, 0.5 – 2.5% Li$_2$O, 11 – 18% Na$_2$O, 0 – 6% K$_2$O, 0 – 0.5% RO, 0 – 0.5% Al$_2$O$_3$ and 0 – 0.5% M$_x$O$_y$, wherein R is an alkaline earth metal, M is a metal other than an alkaline earth metal, x and y are positive integers where (valence of M) multiplied by x = 2y, and in which the numerical values corresponding to the weight percentages of the above oxides satisfy the relationships defined by the following expressions (1) and (2):

$$21 \leq Na_2O + Li_2O + K_2O \leq 15.5 \quad (1)$$

$$52 - 2ZrO_2 \leq 4Li_2O - K_2O \leq ZrO_2 - 21 \quad (2)$$

and the glass fibers formed therefrom had an extremely great resistance to alkalis as well as had a spinning temperature (T$_F$) lower than 1310° C, a T$_F$ – T$_L$ exceeding 50° C., and superior spinnability.

It is still more advantageous for the glass composition or glass fibers of the invention when not only the relationships of the above expressions (1) and (2) are satisfied but also the relationship of the following expression (3) is satisfied.

$$94 - 3ZrO_2 \geq 6Li_2O + Na_2O \geq ZrO_2 - 1 \quad (3)$$

Further, it is especially advantageous when the total content of Na$_2$O + Li$_2$O + K$_2$O satisfies the relationship shown by the following expression (1'):

$$21 \geq Na_2O + Li_2O + K_2O \geq 17 \quad (1')$$

In this manner it becomes possible as a general rule to reduce the spinning temperature (T$_F$) while at the same time retain a relatively great temperature difference (T$_F$ – T$_F$) (see Table 5).

Thus, it is especially advantageous when the relationships shown by the foregoing expressions (1') and (2) are satisfied.

Therefore, it was found in accordance with our researches that a glass composition comprising the following oxides in a weight percentage composition of 58 – 63% SiO$_2$, 19 – 23.5% ZrO$_2$, 1 – 2% Li$_2$O, 13 – 17% Na$_2$O, 0.5 – 3% K$_2$O, 0 – 0.5% RO, 0 – 0.5% Al$_2$O$_3$ and 0 – 0.5% M$_x$O$_y$, wherein R in an alkaline earth metal, M is a metal other than an alkaline earth metal, x and y are positive integers where (valence of M) multiplied by x = 2y, and in which the numerical values corresponding to the weight percentages of the oxides satisfy the relationships defined by expressions (1) and (2), particularly expressions (1') and (2); or the alkali resistant glass fibers formed therefrom were especially suitable.

Further, the oxides of the following formulation were especially suitable in the present invention.

SiO$_2$, 58 – 63%,
ZrO$_2$, 20 – 22.5%,
Li$_2$O, 1 – 2%,
Na$_2$O, 13 – 17%,
K$_2$O, 0.5 – 2.5%
RO, 0 – 0.5%,
Al$_2$O$_3$, 0 – 0.5%,
M$_x$O$_y$, 0 – 0.5%.

wherein R, M, x and y are as defined above, and the percentages are on a weight basis.

In the present invention, as a result of having controlled the contents of the oxides in the glass composition to fall within the ranges indicated above, there is no need to add such alkaline earth metal oxides as CaO that have been widely used as a flux in the past, and this is to be preferred. However, if such a component becomes admixed as an impurity in the starting materials, it is desirable that it be held to below 0.5% of the glass composition as a whole.

Again, it is permissible to incorporate in an amount of about 0.5% such oxides as P$_2$O$_5$ and B$_2$O$_3$ that we have previously proposed, but there is no special need to add these oxides.

Further, such other oxides say of V, Cr, Mn, Fe, Co, Cu, Zn, As, Y, Mo, Cd, Sn, Sb, Hf and Ce should preferably by controlled such that their total content does not exceed 0.5% by weight based on the total weight of the glass composition of the invention.

It is permissible that Al$_2$O$_3$ be contained in an amount of not more than about 0.5% by weight based on the total weight of the glass composition of the invention. On the other hand, it is rather advantageous to control the content of TiO$_2$ to an amount not exceeding about 0.3% by weight.

In the present invention CaF$_2$ is dealt as CaO and F$_2$ and, as already stated hereinbefore, the content of CaO should be held to below 0.5% by weight, while the content of F$_2$ is preferably controlled such that it does not exceed 0.3% by weight, particularly 0.1% by weight. In the present invention there is no need at all of adding CaF$_2$, and it preferably should not be added. In the present specification the contents of the oxides mentioned hereinbefore are indicated in weight percent based on the total weight of all the oxides exclusive of the content of F$_2$.

The glass fibers of the invention possess great resistance to alkalis as noted hereinbefore. Since these glass fibers possess superior durability when embedded in a cement matrix and moreover maintain their excellent strength and Young's modulus over a long period of time, they are valuable as a reinforcing material of cement.

In obtaining glass fiber-reinforced cement products (structures) by incorporating the glass fibers of the invention in cement, the diameter of the glass fibers to be used and the amounts in which they are to be incorporated will vary somewhat depending upon say the purpose to which the resulting cement product is to be put and the molding method, but in general fibers having a diameter ranging from 5 to 50 microns are suitably incorporated in an amount in the range 0.3 - 25% by weight of the cement. The reinforcing effects are small when the diameter of the fibers are finer than 5 microns. Furthermore there is the objection that their dispersion becomes poor when incorporating the fibers as continuous filaments and staples. On the other hand, thick fibers exceeding 50 microns are also difficult to handle, since not only a reduction in impact strength and flexural strength take place but also because there is a increase in fiber breakage. Thus, fibers of diameters ranging from 7 to 30 microns are to be preferred. On the other hand, as regards the amount to be incorporated adequate reinforcement of the cement cannot be realized when the amount is less than 0.3% by weight, whereas when the amount exceeds 25% by weight, there results a nonuniformity in the state of incorporation of the fibers to cause a weakening of the resulting product instead of strengthening it. In addition, voids are formed as a result of the entanglement of the fibers to cause a reduction of the product density and strength as well as a decline in the reinforcement efficiency of the glass fibers. Again, there is also a disadvantage from the economic standpoint. When these glass fibers are to be incorporated in the usual mortar or concrete, sufficient reinforcement of these materials can be achieved with the incorporation of 0.5 – 20% by weight of the fibers, but the use of 1 –15% by weight is especially desirable. When these glass fibers are to be used as a substitute for asbestos in asbestos slates, they are suitably used in an amount of 0.3 –10% by weight, and particularly 0.5 – 5% by weight. In this case, desirable results are obtained from the standpoint of reinforcement efficiency especially when these glass fibers are used conjointly with asbestos.

In incorporating the glass fibers in a cement matrix, the fibers used may be either continuous filaments or staples. Again, textured materials of either of these forms may also be used. For example, usable are rovings, chopped strands, yarns, tapes, mats, battings, knit and woven materials, etc., the form to be used being chosen optionally in accordance with the intended use of the reinforced product and its method of formation.

When the fibers are to be used as staples, fiber lengths of 1 – 100 millimeters are suitable. A length of less than 1 millimeter is not desirable, since the reinforcement effects would be extremely poor. A length in excess of 100 millimeters is also unsuitable, since a uniformly dispersed state cannot be maintained by a method of merely mixing the glass fibers in the cement mortar mechanically. When fibers in excess of 100 millimeters are to be used, usable is a method of disposing either the filaments or its structured material say knit or woven fabrics or nonwoven fabrics in the cement mortar in an orderly fashion.

For obtaining reinforced cement structures either by mixing or by laminating with cement the glass fibers having the properties described hereinbefore, a method comprising mixing the cement and the glass fibers by a dry method and then adding water or a method comprising mixing or laminating the glass fibers into cement slurry will do. Again, it is also possible to carry out the mixing concurrently with the pouring of the mixed materials into forms. In shaping the mixed or laminated glass fibers and cement, various procedures can be suitably chosen in accordance with the end desired or purpose to which the resulting product is to be put. For example, usable procedures include the die-casting method, spray method, spray suction method, extrusion method or sheet-forming method. The cure and after-treatment can be performed in customary manner by allowing the product to stand at room temperature, as well as other methods such as the centrifugal mold-curing method, pressurized curing method and steam curing method.

The term "cement", as used herein, denotes ordinary hydraulic cements as typified by portland cement. It means one from which basic components are generated when it is made into a cement slurry, examples being portand cement or calcium silicate. If desired, aggregates such as sand, gravel and perlite or pozzolans such as fly ash and activated silica can be incorporated in the cement. The cement structures that can be produced in this invention cover all types of cement products such as press concrete, autoclaved concrete, resin-inpregnated concrete, lightweight concrete, gas concrete, and the asbestos substituted products such as asbestos cement in which asbestos has been substituted as well as asbestos-calcium silicate cement in which the substitution has been made.

The glass fiber-reinforced cement structures of the invention obtained in this manner possess resistance to alkalis, and since the glass fibers are not readily degraded by the crystalline calcium hydroxide contained in cement, these structures can retain their superior flexural and impact strengths over a prolonged period of time. Hence, these cement products are useful for various applications, for example, building materials such as interior and exterior wall panels, ceiling materials, flooring materials or roofing tiles of various structures, as well as civil engineering and landscaping materials such as channels, pipes, curbstones, foundation stones or concrete blocks. Thus, the commercial value of these reinforced cement products is extremely great.

The following experiments (examples and comparative examples) will serve to more specifically illustrate the present invention, it being understood that these experiments are presented for obtaining a better understanding of the invention and not intended to limit the invention thereto.

Before describing the examples and comparative examples, an explanation will be made of the measurement conditions of the various tests that were employed in these experiments and the methods of evaluation of the results thereof.

Composition of glass

Unless otherwise specified, the several components of the glass are shown in weight percentages.

Spinning temperature $(T_F)$ ° C.

About 250 grams of a sample glass mass is melted in an alumina crucible for 2 hours at 1500° C. After completely defoaming the molten glass, a Pt-Rh (80/20%) ball of 10 millimeter diameter is dropped into the molten glass and held there for one hour at the prescribed temperature. After the temperature of the sample molten glass is made uniform, the ball is pulled up out of the molten glass. The rate of ascent of the ball at this time is measured with a viscosity balance. This operation is performed three times, and the average value is calculated. The same operation is carried out with regard to several different measuring temperatures, and a temperature-viscosity curve is plotted therefrom. The temperature corresponding to 1000 poises is then read.

Liquidus temperature $(T_L)$ ° C.

About 50 grams of glass cullets are prepared by using a platinum crucible of 30-cc capacity and operating for 3 hours at 1500° C. These glass cullets are ground in an alumina mortar and prepared into particles which pass thru a 32-mesh but are retained on a 48-mesh screen, following which the particles are washed in distilled water, ethanol and acetone in the sequence given. The glass particles are then packed in a Pt/Au (95/5%) platinum alloy boat and held for 17 – 20 hours in an electric furnace having a temperature gradient followed by being quenched in air. The heat-treated glass is withdrawn from the platinum alloy boat. The glass surface at the bottom side of the boat is then observed with a polarization microscope, and the position of the interface between the crystals and the glass is determined. The temperature of the crystal-glass interface position is read from a graph showing the relationship between the temperature and position of a temperature gradient furnace that had been previously measured. This temperature is designated the liquidus temperature.

Measurement of meltability

Five grams of glass is prepared by melting the glass batch at 1500° C for the prescribed period of time using a platinum crucible having a capacity of 10 cc. The resulting glass is examined with an optical microscope of 50-power magnification for the presence of crystal grains, and the time in minutes required until the crystals are completely melted is measured.

COMPARATIVE EXAMPLE 1

In order to understand the meltability and spinnability of the usually known high $ZrO_2$ content glass composition at the time of its vitrification, as well as its resistance to alkalis, a glass was prepared by carrying out the vitrification of the glass composition shown in the following Table 1 by melting the glass batch for 5 hours at a temperature of 1500° C using a 300-cc platinum alloy crucible. The liquidus temperature ($T_L$° C.) and the spinning temperature ($T_F$° C.) (temperature at a viscosity of 1000 poises) were measured.

The glass composition shown in Table 1 corresponds to that of No. 6/29 described at page 120 of Volf, *Technical Glass*.

The resulting glass was spun using a 300-cc platinum-rhodium (80/20 percent) melter having 36 tips and taken up on a bobbin at a windup rate of 1000 meters per minute. The alkali resistance of the so obtained fibers having a fiber diameter of 13±0.1 microns was measured. The results are shown in Table 1.

The evaluation of the spinnability was performed by observing the state of filament breakage in preparing the foregoing fibers having a diameter of 13±0.1 microns. The results were rated as either excellent, good, fair and poor, as defined below.

Excellent: No filament breakage occurred during a continuous spinning operation of one hour.

Good: Several filament breakages occurred during the one hour period of operation.

Fair: Filament breakages occurred frequently but spinning of fibers was possible Poor: Spinning of fibers was not possible at all.

On the other hand, the resistance to alkalis was evaluated in the following manner. One gram of the resulting fiber was dipped in 100 cc of a 10% aqueous NaOH solution at 80° C., and the decrease in weight (%) after one hour of this treatment was measured.

Table 1

| | | No. 6/29 |
|---|---|---|
| Composition (wt. %): | $SiO_2$ | 62.0 |
| | $ZrO_2$ | 21.0 |
| | $Al_2O_3$ | 0.8 |
| | CaO | 0.5 |
| | $Na_2O$ | 14.0 |
| | $K_2O$ | 2.3 |
| Spinning temperature ($T_F$° C): | | 1384 |
| Liquidus temperature ($T_L$° C): | | 1220 |
| Spinnability: | | poor - fair |
| Meltability (melting time in minutes): | | 121 |
| Alkali resistance (% decrease in weight): | | 1.3 |

The weight percent of the constituents of the composition were converted to mole percent and are reported in the table below.

TABLE 1A

| Run | | NO. 6/29 (comp.). |
|---|---|---|
| Composition (mol%) | $SiO_2$ | 70.2 |
| | $ZrO_2$ | 11.6 |
| | $Al_2O_3$ | 0.5 |
| | CaO | 0.6 |
| | $Li_2O$ | |
| | $Na_2O$ | 15.4 |
| | $K_2O$ | 1.7 |

As apparent from Table 1, considerable difficulty was experienced in spinning the foregoing glass composition into fibers. Moreover, the spinning temperature was high, and thus the life of the melter would be short in commercial operations. Again, since the meltability was extremely poor, this would cause the appearance of unmelted crystal grains when carrying out the production of glass using a melting tank. Further, since it would be necessary to employ an exceedingly high melting temperature, the corrosion of refractories of the melting tank would be excessive.

COMPARATIVE EXAMPLE 2

As there is a proposal of adding CaO as one component for achieving an improvement in the spinnability of the high $ZrO_2$ content glass, a glass was prepared by incorporating CaO in a $ZrO_2$-$Na_2O$ type glass, and the properties of the so obtained glass were evaluated. Glasses having the various compositions shown in Table 2 were produced taking 5 hours at 1500° C using a platinum alloy crucible. The liquidus temperatures ($T_L$ ° C.) and spinning temperatures ($T_F$ ° C.) of the resulting glasses were measured with the results shown in Table 2.

Table 2

| | Comparative Example | | | |
|---|---|---|---|---|
| | 2-1 | 2-2 | 2-3 | 2-4 |
| Composition (wt. %) | | | | |
| $SiO_2$ | 66 | 65 | 63 | 61 |
| $ZrO_2$ | 19 | 19 | 19 | 19 |
| $Na_2O$ | 15 | 15 | 15 | 15 |
| CaO | 0 | 1 | 3 | 5 |
| Spinning temperature ($T_F$,° C) | 1406 | 1386 | 1346 | 1301 |
| Liquidus temperature ($T_L$, C) | 1164 | 1184 | 1221 | 1264 |
| Meltability (melting time in minutes) | 111 | 107 | 103 | 99 |

The weight percent of the constituents of the composition were converted to mole percent and are reported in the table below.

TABLE 2A

| Run | | 2-1 (comp.) | 2-2 (") | 2-3 (") | 2-4 (") |
|---|---|---|---|---|---|
| Composition (mol%) | $SiO_2$ | 73.5 | 72.3 | 70.0 | 67.7 |
| | $ZrO_2$ | 10.3 | 10.3 | 10.3 | 10.3 |
| | $Na_2O$ | 16.2 | 16.2 | 16.2 | 16.1 |
| | CaO | 0 | 1.2 | 3.6 | 5.9 |

As is apparent from Table 2, the spinning temperature ($T_F$° C.) can be lowered by the addition of CaO as one component of the glass. This however is undesirable, since the liquidus temperature ($T_L$ ° C.) rises to result in reducing the temperature difference $T_F - T_L$ (° C.). Especially, when as in Runs 2 - 4 the spinning temperature is in the neighborhood of 1300° C., the relationship $T_F - T_L$ (° C.) $\geqq 50$° C. is not satisfied. Furthermore, it can be said that the incorporation of CaO has not achieved a striking improvement in the meltability of the glass batch.

EXAMPLE 1

This experiment was carried out with the intent of lowering the spinning temperature ($T_F$° C.) at the time of spinning the glass into fibers and also to achieve a still further improvement in the meltability thereof, the experiment being carried out by incorporating $Li_2O$ as one of the glass components. The meltabilities (melting time in minutes) of the glass batches having the compositions shown in Table 3 were determined. Again, the glasses having these compositions were produced taking 5 hours at 1450° C. using a platinum alloy crucible, and the liquidus temperatures ($T_L$ ° C.) and spinning temperatues ($T_F$ ° C.) were measured. The so obtained glasses were then spun into glass fibers having a diameter of 13±0.1 microns by operating in accordance with the procedure described in Comparative Example 1. The alkali resistances of these glass fibers were then determined as in Comparative Example 1 but by treating the fibers for 50 hours at 80° C. in a 10% aqueous NaOH solution.

The results obtained are shown in Table 3, below.

$Li_2O$. It is also seen that the addition of $Li_2O$ is desirable in that there is also an improvement in the resistance to alkalis as well as meltability but, on the other hand, the temperature difference $T_F - T_L$ (° C.) becomes shall, and the spinnability gradually deteriorates. Hence, the amount added of $Li_2O$ should be 0.5 - 2.5% by weight, preferably 1 - 2% by weight.

EXAMPLE 2

This example concerns an experiment wherein $K_2O$ is incorporated as one component of glass, the object being for achieving an improvement in the spinnability of glass at the time of its making by lowering the liquidus temperature and thus expanding the temperature difference $T_F - T_L$ (° C.). Glasses having the compositions shown in Table 4 were produced taking 4 hours at 1500° C. using a platinum alloy crucible, and the liquidus temperatures ($T_L$ ° C.) and spinning temperatures ($T_F$ ° C.) were measured. These glasses were then spun into fibers in accordance with the procedure described in Example 1, following which the alkali resistances and weight decreases (wt. %) were measured. The results obtained are shown in Table 4, below.

Table 3

| Run | Composition (wt. %) | | | | | Spinning temperature ($T_F$ C) | Liquidus temperature ($T_L$° C) | Spinnability | Meltability (melting time)(min) | Alkali resistance (% wt. decrease) |
|---|---|---|---|---|---|---|---|---|---|---|
| | $SiO_2$ | $ZrO_2$ | $Li_2O$ | $Na_2O$ | $K_2O$ | | | | | |
| 3-1 (comp. exp.) | 62.5 | 19.5 | 0 | 15.0 | 3 | 1337 | 1150 | fair | 35 | 11.7 |
| 3-2 (inv. prod.) | 62.0 | 19.5 | 0.5 | 15.0 | 3 | 1310 | 1160 | good | 30 | 11.3 |
| 3-3 (") | 61.5 | 19.5 | 1 | 15.0 | 3 | 1282 | 1185 | excellent | 26 | 11.0 |
| 3-4 (") | 61.5 | 19.5 | 1.5 | 14.5 | 3 | 1248 | 1162 | " | 22 | 10.7 |
| 3-5 (") | 62 | 19.5 | 2 | 13.5 | 3 | 1240 | 1140 | " | 19 | 10.5 |
| 3-6 (") | 61.5 | 19.5 | 2.5 | 13.5 | 3 | 1213 | 1150 | good | 15 | 10.2 |
| 3-7 (comp. exp.) | 61 | 19.5 | 3 | 13.5 | 3 | 1187 | 1160 | poor | 13 | 9.9 |

The weight percent of the constituents of the composition were converted to mole percent and are reported in the table below.

TABLE 3A

| | Run | 3-1 (comp.) | 3-2 (inv.) | 3-3 (") | 3-4 (") | 3-5 (") | 3-6 (") | 3-7 (comp.) |
|---|---|---|---|---|---|---|---|---|
| Composition (mol%) | $SiO_2$ | 70.6 | 69.7 | 68.7 | 68.3 | 68.5 | 67.6 | 66.6 |
| | $ZrO_2$ | 10.8 | 10.7 | 10.6 | 10.6 | 10.5 | 10.4 | 10.4 |
| | $Al_2O_3$ | | | | | | | |
| | CaO | | | | | | | |
| | $Li_2O$ | 0 | 1.1 | 2.2 | 3.4 | 4.4 | 5.5 | 6.6 |
| | $Na_2O$ | 16.4 | 16.3 | 16.2 | 15.6 | 14.5 | 14.4 | 14.3 |
| | $K_2O$ | 2.2 | 2.2 | 2.1 | 2.2 | 2.1 | 2.1 | 2.1 |

It can be seen from Table 3 that the spinning temperature ($T_F$° C.) can be greatly lowered by the addition of Table 4

| Run | Composition (wt. %) | | | | | Spinning temperature ($T_F$° C) | Liquidus temperature ($T_L$° C) | Spinnability | Meltability (melting time)(min) | Alkali resistance (% wt. decrease) |
|---|---|---|---|---|---|---|---|---|---|---|
| | $SiO_2$ | $ZrO_2$ | $Li_2O$ | $Na_2O$ | $K_2O$ | | | | | |
| 4-1 (inv. prod.) | 60.3 | 21 | 1.7 | 17 | 0 | 1263 | 1199 | good | 53 | 10.0 |
| 4-2 (") | 60.3 | 21 | 1.7 | 16 | 1 | 1271 | 1180 | excellent | 57 | 10.3 |
| 4-3 (") | 60.3 | 21 | 1.7 | 15 | 2 | 1278 | 1163 | " | 61 | 10.9 |
| 4-4 (") | 60.3 | 21 | 1.7 | 14 | 3 | 1285 | 1155 | " | 65 | 11.2 |
| 4-5 (") | 60.3 | 21 | 1.7 | 13 | 4 | 1292 | 1165 | " | 69 | 11.7 |
| 4-6 (") | 60.3 | 21 | 1.7 | 12 | 5 | 1297 | 1203 | " | 73 | 12.2 |
| 4-7 (") | 60.3 | 21 | 1.7 | 11 | 6 | 1307 | 1245 | fair-good | 76 | 12.7 |
| 4-8 (comp. exp.) | 60.3 | 21 | 1.7 | 10 | 7 | 1315 | 1277 | poor | 79 | 13.3 |

The weight percent of the constituents of the composition were converted to mole percent and are reported in the table below.

TABLE 4A

| | Run | 4-1 (comp.) | 4-2 (inv.) | 4-3 (") | 4-4 (") | 4-5 (comp) | 4-6 (") | 4-7 (") | 4-8 (") |
|---|---|---|---|---|---|---|---|---|---|
| Composition (mol %) | $SiO_2$ | 66.7 | 66.9 | 67.2 | 67.4 | 67.7 | 67.9 | 68.2 | 68.4 |
| | $ZrO_2$ | 11.3 | 11.4 | 11.4 | 11.4 | 11.4 | 11.5 | 11.6 | 11.6 |
| | $Al_2O_3$ | | | | | | | | |
| | CaO | | | | | | | | |

TABLE 4A-continued

| Run | 4-1 (comp.) | 4-2 (inv.) | 4-3 (") | 4-4 (") | 4-5 (comp) | 4-6 (") | 4-7 (") | 4-8 (") |
|---|---|---|---|---|---|---|---|---|
| Li₂O | 3.8 | 3.8 | 3.8 | 3.8 | 3.8 | 3.9 | 3.9 | 3.9 |
| Na₂O | 18.2 | 17.2 | 16.2 | 15.2 | 14.1 | 13.1 | 12.0 | 11.0 |
| K₂O | 0 | 0.7 | 1.4 | 2.1 | 2.9 | 3.6 | 4.3 | 5.1 |

It can be seen from Table 4 that the addition of $K_2O$ results in a drop in the liquidus temperature ($T_L$ °C.) while there is on the other hand a slight rise in the spinning temperature ($T_F$ °C.). Hence, the temperature difference $T_F - T_L$ (°C.) increases to result in improving the spinnability. However, when the content of $K_2O$ exceeds 3% by weight, the liquidus temperature ($T_L$ °C.) again rises, and when 6% by weight is exceeded, the relationship $T_F - T_L \geq 50°$ C. becomes impossible of satisfying, with the consequence that the spinnability deteriorates. Furthermore, the addition of $K_2O$ is also undersirable in that there is a slight decline in alkali resistance. Hence, the addition of $K_2O$ must be held within the range of 0 - 6% by weight, preferably 0.5 - 3% by weight, and especially 0.5 - 2.5% by weight.

EXAMPLE 3

In this experiment, glasses of various compositions in which the contents of $Na_2O$ were varied in the range of 10 - 19% by weight were made by operating in accordance with the procedure described in Example 1, and the liquidus temperatures ($T_L$ °C.) and spinning temperatures ($T_F$ °C.) were measured. The glasses were then spun into fibers in accordance with the procedure described in Example 1, and the properties were measured, with the results shown in Table 5, below.

As can be seen from Table 5, the incorporation of $Na_2O$ results in not only the drop of the spinning temperature ($T_F$ °C.) but also also a drop in the liquidus temperature ($T_L$ °C.). However, when the content of $Na_2O$ exceeds 16% by weight, the liquidus temperature ($T_L$ °C.) rises, with the consequence that the temperature difference $T_F - T_L$ (°C.) becomes smaller to impair the spinnability. Further, it can be seen that with an increase in the content of $Na_2O$ there is an improvement in the meltability of the glass batch as well as the alkali resistance of the glass. Hence, the content of $Na_2O$ should be in the range of 11 - 18% by weight, and preferably 13 - 17% by weight. Further, the total amount of $Na_2O + K_2O - Li_2O$ should be in the range of 15.5 - 21% by weight and, especially as seen in Runs 5-3 - 5-7 of Table 5, preferably 17 - 21% by weight.

EXAMPLE 4

In this experiment, glasses of various compositions in which the contents of $ZrO_2$ were varied in the range of 18 - 24.5% by weight were made by operating in accordance with the procedure described in Example 1, and the liquidus temperatures ($T_L$ °C.) and spinning temperatures ($T_F$ °C.) were measured. The glasses were then spun into fibers by the procedure described in Example 1, and the properties were measured, with the results shown in Table 6, below.

Table 5

| Run | Composition (wt. %) | | | | | Spinning temperature ($T_F$ °C) | Liquidus temperature ($T_L$ °C) | Spinn- ability | Meltability (melting time)(min) | Alkali resistance (% wt. decrease) |
|---|---|---|---|---|---|---|---|---|---|---|
| | SiO₂ | ZrO₂ | Li₂O | Na₂O | K₂O | | | | | |
| 5-1 (comp. exp.) | 65 | 20 | 2 | 10 | 3 | 1325 | 1115 | fair | 93 | 11.4 |
| 5-2 (inv. prod.) | 64 | 20 | 2 | 11 | 3 | 1302 | 1094 | fair-good | 84 | 11.1 |
| 5-3 (") | 63 | 20 | 2 | 13 | 2 | 1287 | 1081 | excellent | 73 | 10.6 |
| 5-4 (") | 62 | 20 | 2 | 15 | 1 | 1273 | 1067 | " | 61 | 10.2 |
| 5-5 (") | 61 | 20 | 2 | 16 | 1 | 1255 | 1056 | " | 52 | 9.9 |
| 5-6 (") | 60 | 20 | 2 | 17 | 1 | 1237 | 1081 | " | 45 | 9.6 |
| 5-7 (") | 59 | 20 | 2 | 18 | 1 | 1219 | 1131 | " | 40 | 9.4 |
| 5-8 (comp. exp.) | 58 | 20 | 2 | 19 | 1 | 1201 | 1185 | fair-poor | 35 | 9.1 |

The weight percent of the constituents of the composition were converted to mole percent and are reported in the table below.

TABLE 5A

| Run | | 5-1 (comp.) | 5-2 (inv.) | 5-3 (") | 5-4 (") | 5-5 (") | 5-6 (") | 5-7 (") | 5-8 (comp.) |
|---|---|---|---|---|---|---|---|---|---|
| Composition (mol %) | SiO₂ | 71.9 | 70.8 | 69.5 | 68.2 | 66.8 | 66.0 | 64.9 | 63.9 |
| | ZrO₂ | 10.8 | 10.8 | 10.8 | 10.7 | 10.8 | 10.7 | 10.7 | 10.7 |
| | Al₂O₃ | | | | | | | | |
| | CaO | | | | | | | | |
| | Li₂O | 4.4 | 4.4 | 4.4 | 4.4 | 4.5 | 4.4 | 4.4 | 4.4 |
| | Na₂O | 10.7 | 11.8 | 13.9 | 16.0 | 17.2 | 18.1 | 19.2 | 20.3 |
| | K₂O | 2.1 | 2.1 | 1.4 | 0.7 | 0.7 | 0.7 | 0.7 | 0.7 |

Table 6

| Run | Composition (wt. %) | | | | | Spinning temperature ($T_F$ °C) | Liquidus temperature ($T_L$ °C) | Spinn- ability | Meltability (melting time)(min) | Alkali resistance (% wt. decrease) |
|---|---|---|---|---|---|---|---|---|---|---|
| | SiO₂ | ZrO₂ | Li₂O | Na₂O | K₂O | | | | | |
| 6-1 (comp. exp.) | 64.5 | 18 | 1.5 | 14 | 2 | 1283 | 1040 | excellent | 44 | 14.2 |
| 6-2 (inv. prod.) | 63.5 | 19 | 1.5 | 14 | 2 | 1285 | 1071 | " | 49 | 12.5 |
| 6-3 (") | 62.5 | 20 | 1.5 | 14 | 2 | 1287 | 1106 | " | 57 | 11.3 |
| 6-4 (") | 61.5 | 21 | 1.5 | 14 | 2 | 1290 | 1138 | " | 72 | 10.1 |
| 6-5 (") | 60 | 22.5 | 1.5 | 14 | 2 | 1295 | 1188 | " | 97 | 8.6 |

Table 6-continued

| Run | Composition (wt. %) | | | | | Spinning temperature $(T_F\ °C)$ | Liquidus temperature $(T_L\ °C)$ | Spinn-ability | Melt-ability (melting time)(min) | Alkali resistance (% wt. decrease) |
|---|---|---|---|---|---|---|---|---|---|---|
| | $SiO_2$ | $ZrO_2$ | $Li_2O$ | $Na_2O$ | $K_2O$ | | | | | |
| 6-6 (") | 59 | 23.5 | 1.5 | 14 | 2 | 1299 | 1222 | good | 112 | 7.5 |
| 6-7 (comp. exp.) | 58 | 24.5 | 1.5 | 14 | 2 | 1302 | 1265 | fair-poor | 131 | 6.4 |

The weight percent of the constituents of the composition were converted to mole percent and are reported in the table below.

TABLE 6A

| Run | | 6-1 (comp.) | 6-2 (inv.) | 6-3 (") | 6-4 (") | 6-5 (") | 6-6 (") | 6-7 (comp.) |
|---|---|---|---|---|---|---|---|---|
| Composition (mol %) | $SiO_2$ | 70.8 | 70.1 | 69.4 | 68.6 | 67.5 | 66.8 | 66.1 |
| | $ZrO_2$ | 9.6 | 10.2 | 10.8 | 11.4 | 12.3 | 13.0 | 13.6 |
| | $Al_2O_3$ | | | | | | | |
| | CaO | | | | | | | |
| | $Li_2O$ | 3.3 | 3.3 | 3.3 | 3.4 | 3.4 | 3.4 | 3.4 |
| | $Na_2O$ | 14.9 | 15.0 | 15.1 | 15.1 | 15.3 | 15.4 | 15.4 |
| | $K_2O$ | 1.4 | 1.4 | 1.4 | 1.4 | 1.4 | 1.4 | 1.5 |

The weight percent of the constituents of the composition were converted to mole percent and are reported in the table below.

TABLE 7A

| Run | | 7-1 (comp.) | 7-2 (") | 7-3 (") | 7-4 (") | 7-5 (") | 7-6 (") | 7-7 (inv.) | 7-8 (comp.) | 7-9 (") |
|---|---|---|---|---|---|---|---|---|---|---|
| Composition (mol %) | $SiO_2$ | 69.5 | 68.9 | 68.3 | 67.0 | 65.7 | 70.9 | 68.5 | 65.7 | 65.6 |
| | $ZrO_2$ | 12.8 | 12.8 | 12.2 | 12.3 | 12.5 | 11.6 | 11.4 | 12.5 | 12.7 |
| | $Al_2O_3$ | | | | | | | | | |
| | CaO | | | | | | | | | |
| | $Li_2O$ | 2.3 | 2.3 | 4.5 | 3.4 | 2.3 | 2.3 | 3.8 | 4.5 | 4.5 |
| | $Na_2O$ | 13.3 | 13.8 | 15.1 | 17.3 | 16.6 | 11.5 | 14.1 | 17.3 | 14.3 |
| | $K_2O$ | 2.2 | 2.2 | 0 | 0 | 2.9 | 3.6 | 2.1 | 0 | 2.9 |

It can be seen from Table 6 that there is an improvement in the alkali resistance with an increase in the content of $ZrO_2$. However, an increase in the content of $ZrO_2$ results in a rise in the liquidus temperature to reduce the temperature difference $T_F - T_L$ (° C.) and impair the spinnability of the glass. Furthermore, there is also a great decline in the meltability of the glass batch in proportion as the amount contained of $ZrO_2$ is increased. Hence, the content of $ZrO_2$ should be in the range of 18.5 – 23.5% by weight, preferably 19 – 23.5% by weight, and more preferably 20 –22.5% by weight.

EXAMPLE 5

This experiment was performed for clarifying the significance of the inequalities $52 - 2ZrO_2 \geq 4Li_2O - K_2O \geq ZrO_2 - 21$ (expression 2) and $94 - 3ZrO_2 \geq 6Li_2O + Na_2O \geq ZrO_2 - 1$ (expression 3). For this purpose, glasses of various compositions shown in Tables 7 and 8, below, were made, and the spinning temperatures $(T_F\ ° C.)$ and liquidus temperatures $(T_L\ ° C.)$ were measured.

The results obtained are shown in Tables 7 and 8.

As is apparent from Table 7, glasses of compositions not satisfying the relationship $52 - 2ZrO_2 \geq 4Li_2O - K_2O \geq ZrO_2 - 21$ (expression 2) either have a high spinning temperature $(T_F)$ or its temperature difference $T_F - T_L$ (° C.) is too small, and hence its spinnability is poor.

Table 8

| Run | 8-1 (invention product) | 8-2 (invention product) |
|---|---|---|
| Composition (wt. %) | | |
| $SiO_2$ | 60.2 | 60.7 |
| $ZrO_2$ | 21.5 | 21.5 |
| $Li_2O$ | 1.3 | 1.3 |
| $Na_2O$ | 12.5 | 14.5 |
| $K_2O$ | 4.5 | 2 |
| Spinning temperature $(T_F\ °C)$ | 1299 | 1295 |
| Liquidus temperature $(T_L\ °C)$ | 1210 | 1172 |
| $T_F - T_L$ (° C) | 89 | 123 |
| $52 - 2ZrO_2$ | 9 | 9 |
| $4Li_2O - K_2O$ | 0.7 | 3.2 |
| $ZrO_2 - 21$ | 0.5 | 0.5 |
| $94 - 3ZrO_2$ | 29.5 | 29.5 |

Table 7

| Run | 7-1 (comp. exp.) | 7-2 (comp. exp.) | 7-3 (comp. exp.) | 7-4 (inv. prod.) | 7-5 (comp. exp.) | 7-6 (comp. exp.) | 7-7 (inv. prod.) | 7-8 (comp. exp.) | 7-9 (inv. prod.) |
|---|---|---|---|---|---|---|---|---|---|
| Composition (wt. %) | | | | | | | | | |
| $SiO_2$ | 61 | 60.5 | 61.5 | 60 | 57.5 | 62.5 | 61.3 | 59 | 58 |
| $ZrO_2$ | 23 | 23 | 22.5 | 22.5 | 22.5 | 21 | 21 | 23 | 23 |
| $Li_2O$ | 1 | 1 | 2 | 1.5 | 1.0 | 1 | 1.7 | 2.0 | 2.0 |
| $Na_2O$ | 12 | 12.5 | 14 | 16 | 15 | 10.5 | 13 | 16 | 13 |
| $K_2O$ | 3 | 3 | 0 | 0 | 4 | 5 | 3 | 0 | 4 |
| Spinning temperature $(T_F\ °C)$ | 1352 | 1341 | 1299 | 1290 | 1210 | 1360 | 1293 | 1268 | 1283 |
| Liquidus temperature $(T_L\ °C)$ | 1275 | 1262 | 1304 | 1220 | 1298 | 1135 | 1140 | 1240 | 1200 |
| $T_F - T_L$ (° C) | 77 | 79 | −5 | 70 | −88 | 225 | 153 | 28 | 83 |
| $52 - 2ZrO_2$ | 6 | 6 | 7 | 7 | 7 | 10 | 10 | 6 | 6 |
| $4Li_2O - K_2O$ | 1 | 1 | 8 | 6 | 0 | −1 | 3.8 | 8 | 4 |
| $ZrO_2 - 21$ | 2 | 2 | 1.5 | 1.5 | 1.5 | 0 | 0 | 2 | 2 |

Table 8-continued

| Run | 8-1 (invention product) | 8-2 (invention product) |
|---|---|---|
| 6Li$_2$O + Na$_2$O | 20.3 | 22.3 |
| ZrO$_2$ - 1 | 20.5 | 20.5 |

The weight percent of the constituents of the composition were converted to mole percent and are reported in the table below.

TABLE 8A

| | Run | 8-1 (comp.) | 8-2 (inv.) |
|---|---|---|---|
| Composition (mol%) | SiO$_2$ | 68.2 | 68.1 |
| | ZrO$_2$ | 11.9 | 11.8 |
| | Al$_2$O$_3$ | | |
| | CaO | | |
| | Li$_2$O | 3.0 | 2.9 |
| | Na$_2$O | 13.7 | 15.8 |
| | K$_2$O | 3.3 | 1.4 |

As can be seen from Table 8 the compositions satisfying the relationships defined by expressions (2) and (3) are suitable for use in this invention in view of their especially great temperature difference $T_F - T_L$ (° C.).

We claim:

1. An alkali resistant glass composition consisting essentially of the following oxides, in weight percentages:
   SiO$_2$; 57 - 64%
   ZrO$_2$; 19 - 23.5%
   Li$_2$O; 0.5 - 2.5%
   Na$_2$O; 11 - 18%
   K$_2$O; 0.5 - 3%
   wherein
   (a) 21 ≧ Na$_2$O + Li$_2$O + K$_2$O ≧ 15.5, and
   (b) 52 - 2ZrO$_2$ ≧ 4Li$_2$O - K$_2$O ≧ ZrO$_2$ - 21, and said composition having a glass spinning temperature ($T_F$) ≧ 1310° C. and a difference between the glass spinning temperature ($T_F$) and the glass liquidus temperature (T) ≧ 50° C.

2. The composition of claim 1 which contains the following constituents, in weight precentages:
   RO; 0 - 0.5%
   Al$_2$O$_3$; 0 - 0.5%
   M$_x$O$_y$; 0 -0.5%
   wherein R is an alkaline earth metal, M is a metal other than the above metal components, and x and y are positive integers and the valence of M multiplied by x equals 2y.

3. The composition of claim 1 wherein the recited constituents comprise 100 to 98.5% by weight of the composition.

4. The composition of claim 2 wherein the recited constituents comprise 0 to 1.5% by weight of the composition.

5. The alkali resistance glass composition of claim 1 wherein said oxides have the following weight percentages:
   SiO$_2$; 58 - 63%
   ZrO$_2$; 19 - 23.5%
   Li$_2$O; 1 - 2%
   Na$_2$O; 13 - 17%
   K$_2$O; 0.5 - 3%.

6. The alkali resistant glass composition of claim 1 wherein said oxides have the following weight percentage:
   SiO$_2$; 58 - 63%
   ZrO$_2$; 20 - 22.5%
   Li$_2$O; 1 - 2%
   Na$_2$O; 13 - 17%
   K$_2$O; 0.5 - 2.5%

7. Alkali resistant glass fibers having a composition consisting essentially of the following oxides, in weight percentages:
   SiO$_2$; 57 - 64%
   ZrO$_2$; 19 - 23.5%
   Li$_2$O; 0.5 - 2.5%
   Na$_2$O; 11 - 18%
   K$_2$O; 0.5 - 3%
   wherein
   (a) 21 ≧ Na$_2$O + Li$_2$O + K$_2$O ≧ 15.5, and
   (b) 52 - 2ZrO$_2$ ≧ 4Li$_2$O - K$_2$O ≧ ZrO$_2$ - 21, and said composition having a glass spinning temperature ($T_F$) ≧ 1310° C. and a difference between the glass spinning temperature ($T_F$) and the glass liquidus temperature (T) ≧ 50° C.

8. The glass fibers of claim 7 in which the glass composition contains the following constituents, in weight percentages:
   RO; 0 - 0.5%
   Al$_2$O$_3$; 0 - 0.5%
   M$_x$O$_y$; 0 - 0.5%
   wherein R is an alkaline earth metal, M is a metal other than the above metal components, and x and Y are positive integers and the valence of M multiplied by x equals 2y.

9. The glass fibers of claim 7 wherein the recited constituents of the glass composition comprise 100 to 98.5% by weight of the composition.

10. The glass fibers of claim 8 wherein the recited constituents of the glass composition comprise 0 to 1.5% by weight of the composition.

11. The glass fibers of claim 7 wherein the difference between the glass spinning temperature ($T_F$) and the glass liquidus temperature ($T_L$) of said glass composition ≧ 60° C.

12. The glass fibers of claim 7 wherein the glass spinning temperature ($T_F$) of said glass composition ≧ 1300° C.

13. The alkali resistant glass fibers of claim 7 wherein said oxides in said glass composition have the following weight percentages:
   SiO$_2$; 58 - 63%
   ZrO$_2$; 19 - 23.5%
   Li$_2$O; 1 - 2%
   Na$_2$O; 13 - 17%
   K$_2$O; 0.5 - 3%.

14. The alkali resistant glass fibers of claim 7 wherein said oxides in said glass composition have the following weight percentages:
   SiO$_2$; 58 - 63%
   ZrO$_2$; 20 - 22.5%
   Li$_2$O; 1 - 2%
   Na$_2$O; 13 - 17%
   K$_2$O; 0.5 - 2.5%.

15. The alkali resistant glass fibers of claim 7 wherein said oxides in said glass composition have the following weight percentage:
   SiO$_2$; 57 - 64%
   ZrO$_2$; 19 - 23.5%
   Li$_2$O; 0.5 - 2.5%
   Na$_2$O; 11 - 18%
   K$_2$O; 0.5 - 3%
   wherein
   (a) 21 ≧ Na$_2$O + Li$_2$O + K$_2$O ≧ 17, and
   (b) 52 - 2ZrO$_2$ ≧ 4Li$_2$O - K$_2$O ≧ ZrO$_2$ - 21.

16. A glass fiber reinforced cement composition comprising cement and the glass fibers of claim 7.

17. A glass fiber reinforced cement composition of claim 16 wherein the glass fibers have a diameter of 5 to 50 microns and said glass fibers comprise 0.3 – 25% by weight of said cement composition.

18. A glass fiber reinforced cement composition of claim 17 in which the glass fibers are 1 – 100 millimeters in length.

* * * * *

UNITED STATES PATENT AND TRADEMARK OFFICE
CERTIFICATE OF CORRECTION

PATENT NO. : 4,140,533
DATED : February 20, 1979
INVENTOR(S) : OHTOMO, ET AL.

It is certified that error appears in the above-identified patent and that said Letters Patent are hereby corrected as shown below:

Claim 1, column 17, line 38, delete "$(T_F) \geq 1310°C$" and insert -- $(T_F) \leq 1310°C$ --.

Claim 1, column 17, line 40, delete "(T)" and insert -- $(T_L)$ --.

Claim 7, column 18, line 16, delete "$(T_F) \geq 1310°C$" and insert -- $(T_F) \leq 1310°C$ --.

Claim 7, column 18, line 18, delete "(T)" and insert -- $(T_L)$ --.

Claim 12, column 18, lines 40-41, delete "$\geq 1300°C$" and insert -- $\leq 1300°C$ --.

Signed and Sealed this

Eighth Day of May 1979

[SEAL]

Attest:

RUTH C. MASON
*Attesting Officer*

DONALD W. BANNER
*Commissioner of Patents and Trademarks*